US008810589B1

(12) United States Patent
Khoury et al.

(10) Patent No.: US 8,810,589 B1

(45) Date of Patent: Aug. 19, 2014

(54) METHOD AND APPARATUS FOR REFRESHING DISPLAY

(75) Inventors: Rabeeh Khoury, Tarshiha (IL); Dan Ilan, Herzellia (IL); Eran Maor, Nes Ziona (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 770 days.

(21) Appl. No.: 12/942,178

(22) Filed: Nov. 9, 2010

Related U.S. Application Data

(60) Provisional application No. 61/260,758, filed on Nov. 12, 2009.

(51) Int. Cl.
*G06F 13/00* (2006.01)
*G09G 5/39* (2006.01)

(52) U.S. Cl.
USPC ............................ 345/537; 345/531; 345/536

(58) Field of Classification Search
CPC .... G06T 1/60; G09G 5/363; G09G 2360/121; G09G 2360/18; G09G 2360/12; G09G 2330/21; G09G 2360/128; G06F 1/3203; G06F 1/3275; G06F 1/3287; G06F 2213/0038
See application file for complete search history.

(56) References Cited

U.S. PATENT DOCUMENTS 5,421,000 A * 5/1995 Fortino et al. ................ 711/118
5,829,028 A * 10/1998 Lynch et al. .................. 711/126
5,860,016 A * 1/1999 Nookala et al. ............... 713/324
6,680,738 B1 * 1/2004 Ishii et al. ..................... 345/568
2005/0225556 A1 * 10/2005 Booth, Jr. ...................... 345/537
2010/0321398 A1 * 12/2010 Kawahara ..................... 345/545

OTHER PUBLICATIONS

Samsung SRAM datasheet on K7A401800M; 1999.*
Micro DRAM datasheet on MT4LC4M16F4; 2000.*
Machine translated: Nen et al., JP,2001-042855.*

* cited by examiner

*Primary Examiner* — Kee M Tung
*Assistant Examiner* — Sing-Wai Wu

(57) ABSTRACT

Aspects of the disclosure provide an integrated circuit. The integrated circuit includes a first memory, a memory controller, and a display controller coupled to a display module. The memory controller is selectively coupled to the first memory and to a second memory that has higher power consumption than the first memory. The second memory includes a frame buffer storing pixel data of images to be displayed on the display module. When the integrated circuit enters a power saving mode, the memory controller, while coupled to the first memory and the second memory, pre-fetches pixel data of an image from the second memory into the first memory at a first data rate. Further, when the integrated circuit is in the power saving mode, the display controller streams the pixel data from the first memory to the display module at a second data rate that is lower than the first data rate, and the second memory is configured into a memory power-saving mode after the pre-fetching until the second memory is accessed for additional pixel data.

20 Claims, 7 Drawing Sheets

400

410 420 430

| | L2 CACHE (128KB) | FIFO BUFFER (128B) |
|---|---|---|
| DRAM FREQUENCY | 533MHz | 533MHz |
| DRAM BUS WIDTH | 32 BITS | 32 BITS |
| DRAM BANDWIDTH | ~4GB/SEC | ~4GB/SEC |
| DRAM SRM LATENCY (CLOCK CYCLES) | ~512 | ~512 |
| LCD REFRESH RATE | ~355MB/SEC | ~355MB/SEC |
| PRE-FETCH PERIOD (CLOCK CYCLES) | ~192K | ~192 |
| DRAM BUSY (CLOCK CYCLES) | ~17K | ~17 |
| DRAM IDLE (CLOCK CYCLES) | ~175K | ~175 |

FIG. 4

METHOD AND APPARATUS FOR REFRESHING DISPLAY

INCORPORATION BY REFERENCE

This application claims the benefit of U.S. Provisional Application No. 61/260,758, "Method of Refreshing LCD Display with Minimal Access to Main Memory" filed on Nov. 11, 2009, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Generally, displays, such as cathode ray tube (CRT), plasma display panel (PDP), liquid-crystal display (LCD) panel, and the like, refresh continuously during operation. In an example, an LCD panel is coupled to a frame buffer via a display controller. The frame buffer receives and stores pixel data corresponding to one or more images. During operation, new images are generated and stored in the frame buffer. The display controller continuously streams pixel data corresponding to images at a refresh rate, such as 60 images per second (60 Hz), from the frame buffer to the LCD panel. The LCD panel receives the pixel data stream, scans and drives pixels on a screen based on the pixel data stream. Thus, the displayed image on the screen refreshes 60 times per second, for example.

SUMMARY

Aspects of the disclosure provide an integrated circuit. The integrated circuit includes a first memory, a memory controller, and a display controller coupled to a display module. The memory controller is selectively coupled to the first memory and to a second memory that has higher power consumption than the first memory. The second memory includes a frame buffer storing pixel data of images to be displayed by the display module. When the integrated circuit enters a first mode, such as a power saving mode, an e-book mode and the like, the memory controller, while coupled to the first memory and the second memory, pre-fetches pixel data of an image from the second memory into the first memory based on a first data rate. Further, when the integrated circuit is in the first mode, the display controller streams the pre-fetched pixel data from the first memory to the display module based on a second data rate that is lower than the first data rate, and the second memory is configured into a memory power-saving mode after the pre-fetching. In an embodiment, the second memory is an external memory. In an example, the memory controller configures the second memory into the memory power-saving mode. In another example, the memory controller is configured into a power-saving mode after the pre-fetching, and the second memory enters a self-refresh mode when an idle time is longer than a threshold. Further, when the second memory is accessed for additional pixel data, the second memory exits the power saving mode.

Further, when the integrated circuit is in a second mode, such as a regular operating mode, an active mode, and the like, the display controller streams the pixel data from the second memory to the display module based on the second data rate via the memory controller. In an embodiment, the integrated circuit includes a processing unit that is coupled to the first memory to use the first memory as a cache memory when the integrated circuit is in the second mode. The processing unit is decoupled from the first memory when the integrated circuit is in the first mode.

In an embodiment, the first mode is an e-book mode. When the integrated circuit is in the e-book mode, the memory controller is configured to pre-fetch the pixel data corresponding to a still image from the second memory into the first memory. When the first memory is large enough, in an example, the memory controller is configured to pre-fetch once the pixel data corresponding to the entire still image from the second memory into the first memory.

In another embodiment, the first memory is not large enough to store the pixel data for an entire image, then the memory controller is configured to periodically pre-fetch the pixel data corresponding to portions of the image from the second memory into the first memory.

Aspects of the disclosure provide a method for refreshing display. The method includes pre-fetching pixel data corresponding to an image into a first memory on a system-on-chip (SOC) from a second memory based on a first data rate. In an embodiment, the method includes periodically pre-fetching the pixel data corresponding to the image into the first memory on the SOC from the second memory based on the first data rate. The second memory has higher power consumption than the first memory. Further, the method includes streaming the pixel data from the first memory to a display module based on a second data rate that is lower than the first data rate to refresh a screen of the display module, and configuring the second memory into a memory power-saving mode after the pre-fetching. In an embodiment, the second memory exits the memory power-saving mode when the second memory is accessed for additional pixel data.

According to an aspect of the disclosure, the method includes decoupling the first memory from the display module when a processing unit enters an active mode to use the first memory as a cache memory, and coupling the first memory to the display module when the processing unit enters an idle mode. When the processing unit enters the active mode, the method includes streaming the data from the second memory to the display module based on the second data rate when the first memory is decoupled from the display module.

Aspects of the disclosure provide an apparatus. The apparatus includes a display module configured to display an image frame on a screen based on pixel data of the image frame, an external memory device configured to include a frame buffer that stores pixel data of image frames to be displayed on the display module, and a system-on-chip (SOC). The system-on-chip includes an internal memory having lower power consumption than the external memory device, a memory controller coupled with the internal memory and the external memory device, and a display controller coupled with the display module. The memory controller is configured to pre-fetch pixel data of an image from the external memory device into the internal memory based on a first data rate when the apparatus enters a first mode, such as a power saving mode, an e-book mode, and the like. The display controller is configured to stream the pixel data from the internal memory to the display module based on a second data rate that is lower than the first data rate. The external memory device is configured into a memory power-saving mode after the pre-fetching. The external memory device exits the memory power-saving mode when the external memory device is accessed for additional pixel data.

BRIEF DESCRIPTION OF THE DRAWINGS

Various embodiments of this disclosure that are proposed as examples will be described in detail with reference to the following figures, wherein like numerals reference like elements, and wherein:

FIG. 4 shows a comparison table according to an embodiment of the disclosure.

DETAILED DESCRIPTION OF EMBODIMENTS

Figure 1:
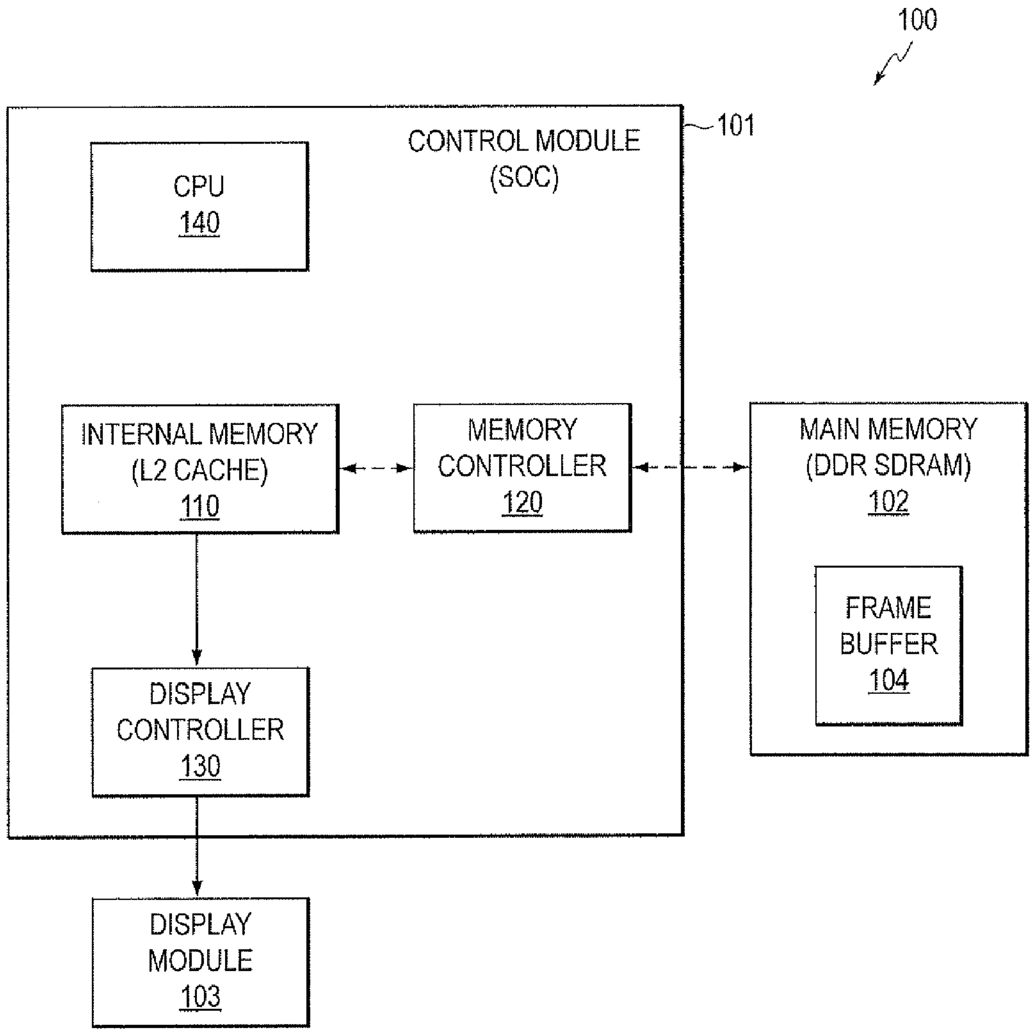
FIG. 1 shows a block diagram of an apparatus example according to an embodiment of the disclosure.

FIG. 1 shows a block diagram of an apparatus example 100 according to an embodiment of the disclosure. The apparatus 100 includes a display module 103, a control module 101 and a main memory 102. The control module 101 is suitably configured to pre-fetch pixel data from the main memory 102 in a burst form, and to forward the pre-fetched pixel data to the display module 103 in a stream form. Thus, the main memory 102 has a relatively longer idle time, and is suitably configured in a power-saving mode in order to save power. In an embodiment, these elements are coupled together as seen in FIG. 1.

The apparatus 100 corresponds to any suitable electronic system, such as a laptop, a desktop, a handheld device, and the like. In an embodiment, the apparatus 100 is a battery powered electronic system, suitably for example a tablet computer, an electronic book reader or any other suitable electronic device. In another embodiment, the control module 101 and the main memory 102 are integrated on a PCB board that is battery powered. The PCB board is coupled with the display module 103 via a wired or wireless link.

The display module 103 uses any suitable display technology, such as liquid crystal display (LCD) panel, cathode ray tube (CRT), plasma display panel (PDP), and the like, to produce visual images on a screen based on digital data. Generally, the display module 103 refreshes the visual image on the screen based on a refresh rate. In an example, the display module 103 receives and displays 60 images per second, and thus has a refresh rate of 60 Hz. In an embodiment, the display module 103, for example, CRT or PDP, is configured to have a relatively constant refresh rate during operation even when the images to be displayed are identical. In another embodiment, the display module 103, such as LCD, is configured to have a variable refresh rate to suit for different display scenarios, such as, generally still images, relatively low speed movements, or relatively high speed movements, and the like.

Specifically, in typical operation of an embodiment, the display module 103 receives pixel data in a stream form having a data rate corresponding to the refresh rate. Then, the display module 103 scans and drives pixels on the screen based on the pixel data and produces the corresponding image. In an example, each image frame to be displayed on the screen has 1920×1080 pixels, and each pixel is controlled by three bytes that respectively control intensity of three colors, such as red (R), green (G), and blue (B). Thus, in an embodiment, the display module 103 receives the pixel data at a data rate of about 355 MB/see, which is a product of the refresh rate, the number of pixels of the screen, and the control data per pixel.

In an embodiment, the main memory 102 stores data corresponding to image frames to be displayed. In an embodiment, the main memory 102 is configured to include a frame buffer 104. The frame buffer 104 stores pixel data corresponding to one or more image frames, and is configured to enable provision of a suitable pixel stream to the display controller. When the pixel data is provided to the display module 103 in a stream form having the data rate, the display module 103 scans and drives pixels on the screen based on the received pixel data. It is noted that the main memory 102 also stores other suitable data, such as application and system codes, intermediate processing data, and the like.

Generally, the main memory 102 has a relatively large storage space for the frame buffer and the other suitable data storage. In addition, the main memory 102 is configured to have a relatively large bandwidth to enable fast access. In an embodiment, the main memory 102 has a relatively large storage space to store suitable data and codes that are needed for a processor to operate. In an example, the main memory 102 is implemented as a double date rate (DDR) synchronous dynamic random access memory (SDRAM) chip, such as DDR, DDR2, DDR3, and the like. In addition, the main memory 102 has a relatively large bandwidth to enable fast data access for various operations. In a DDR SDRAM chip example, the main memory 102 operates at a 533 MHz clock frequency with a 32-bit bus, and thus has a maximum bandwidth of about 4 GB/sec. However, in an embodiment, the main memory 102 consumes relatively large power. The relatively large power consumption can be problematic for some implementations, such as in green devices, or battery powered devices in which available power is constrained.

In an embodiment, the main memory 102 has multiple operation modes, such as an active access mode, a power-saving mode, and the like. In an example, when the main memory 102 is configured in the active access mode, the main memory 102 operates at a relatively high voltage, and/or a relatively high clock frequency, and supports any suitable memory access activities. Due to the relatively large storage space and the relatively large bandwidth, the main memory 102 consumes a relatively large power in the active access mode.

When the main memory 102 enters the power-saving mode, suitable techniques, such as reducing voltage, reducing clock frequency, and the like, are applied to reduce power consumption. In an example, the main memory 102 has a self-refresh mode (SRM), in which only limited activities, such as self-refresh of DRAM cells, are performed to reduce power consumption by the main memory 102.

The main memory 102 switches between operation modes automatically or by external control. In an embodiment, the main memory 102 includes suitable circuit to detect an idle time of an interface to external links. When the idle time is longer than a threshold, the main memory 102 enters the SRM, for example. Further, any activity of the interface causes the main memory 102 to exit the SRM and return to the active access mode. In another embodiment, when the main memory 102 receives an external control signal, the main memory 102 enters the SRM; and any access activities cause the main memory 102 to exit the SRM and return to the active access mode.

The control module 101 suitably uses a relatively low power memory, such as a L2 cache, that is configured to selectively enable, in a power saving mode, a pre-fetch-and-forward style of operation to pre-fetch pixel data in a burst form from the main memory 102 into the low power memory, and forward the pixel data in a stream form from the low power memory to the display module 103 for producing images on the screen. Thus, the main memory 102 enters the power-saving mode between bursts of data pre-fetching, when no memory access activity is performed.

In an embodiment, the control module 101 is implemented as a single integrated chip, such as a system-on-chip (SOC). The SOC 101 includes an internal memory 110, a memory controller 120, and a display controller 130. It is noted that the SOC 101 can include other suitable components, such as a central processing unit (CPU) 140, and the like. These elements are coupled together in an embodiment as seen in FIG. 1. It is noted that other suitable implementation, such as multiple-chip set for the control module 101 is also contemplated.

The display controller 130 provides pixel data to the display module 103 to produce images on the screen. In an embodiment, links between the display controller 130 and the display module 103 have a relatively uniform data rate corresponding to the refresh rate to display images on the screen.

In an embodiment, the internal memory 110 is configured as an L2 cache and has relatively low power consumption compared to the main memory 102. In an example, cells in the internal memory 110 are static random access memory (SRAM) cells that generally have lower power consumption than DRAM cells in the main memory 102. Further, the internal memory 110 has a relatively smaller storage space. In an example, the internal memory 110 has 128 KB storage space, while the storage space for the main memory 102 is typically in the order of 1 GB, or larger. Thus, the internal memory 110 has comparatively lower power consumption respective of the main memory 102.

The memory controller 120 controls memory access to the main memory 102. In an example, the memory controller 120 provides data, address, and writing control signals to the main memory 102 to write data in the address within the main memory 102. In another example, the memory controller 120 provides address and reading control signals to the main memory 102 to read stored data at the address within the main memory 102. In another example, the memory controller 120 provides a mode control signal, such as a SRM control signal, to configure the main memory 102 into the SRM mode, for example.

In an embodiment, links between the memory controller 120 and the main memory 102 has a relatively large bandwidth to enable applications having heavy memory access to be performed at a relatively fast speed. For example, the CPU 140 executes an application that processes an image stream. The CPU 140 continuously accesses the main memory 102 to fetch image data, process the image data, and store the processed image data into the main memory 102. In addition, other components of the SOC 101 also access the main memory 102 via the memory controller 120 for various reasons. For example, the display controller 130 accesses the frame buffer 104 in the main memory 102 to read pixel data, so that the display module 103 produces images on the screen based on the read pixel data.

However, the bandwidth is not fully utilized at all times. In an example, the CPU 140 executes a word processing application that processes inputs from a user. During operation, when the user halts inputting for a time duration, the CPU 140 is idle and does not access the main memory 102 during the time duration. Thus, only a portion of the memory access bandwidth is used, such as a portion of the bandwidth corresponding to pixels required to periodically refresh the display module 103. In an example, when the maximum bandwidth of the main memory 102 is 4 GB/see, and the data rate of the display module 103 is 355 MB/sec, only about 8% of the main memory 102 bandwidth is used for refreshing the display module 103.

According to an embodiment of the disclosure, the memory controller 120 pre-fetches the pixel data in a burst form, for example, using the full bandwidth of the main memory 102, to fill up the internal memory 110. Then, the display controller 130 forwards the pixel data in a stream form, such as at the data rate corresponding to the refresh rate, from the internal memory 110 to the display module 103. Thus, the main memory 102 has a relatively large idle time and is suitably configured into the SRM, for example, when idle between bursts of pixel data.

In an embodiment, the internal memory 110 is selectively coupled to the display controller 130 to enable the pre-fetch-and-forward style of operation as described above. In an example, the internal memory module 110 serves as a cache, such as a L2 cache, for the CPU 140 when the CPU 140 is active, in the example of FIG. 1, the control module (SOC) 101 includes a first bus (not shown) that couples the internal memory module 110 with the CPU 140, and a second bus that couples the internal memory module 110 with the display controller 130. In an embodiment, during operation, when the CPU 140 is active (this arrangement corresponds to a regular operating mode or an active mode, and is not seen in FIG. 1), the first bus is enabled, and the second bus is disabled. The internal memory module 110 serves as the L2 cache for the CPU 140. The display controller 130 obtains the pixel data from the main memory 102 via the memory controller 120, for example at a data rate corresponding to the refresh rate for refreshing the display module 103.

When the CPU 140 is idle, for example when images displayed on the display module 103 are static images, the first bus is disabled, and the second bus is enabled. The internal memory module 110 serves as the low power memory to enable the pre-fetch-and-forward operation to reduce power consumption. Specifically, the memory controller 120 pre-fetches pixel data in a burst form from the main memory 102 into the internal memory module 110, and the display controller 130 forwards the pixel data in a stream form from the internal memory 110 to the display module 103. Due to a bandwidth difference between the burst form and the stream form, the main memory 102 and the memory controller 120 has a relatively long idle time. In an example, when the idle time is longer than a threshold, the main memory 102 and the memory controller 120 are suitably configured into the SRM, for example.

Figure 2A:
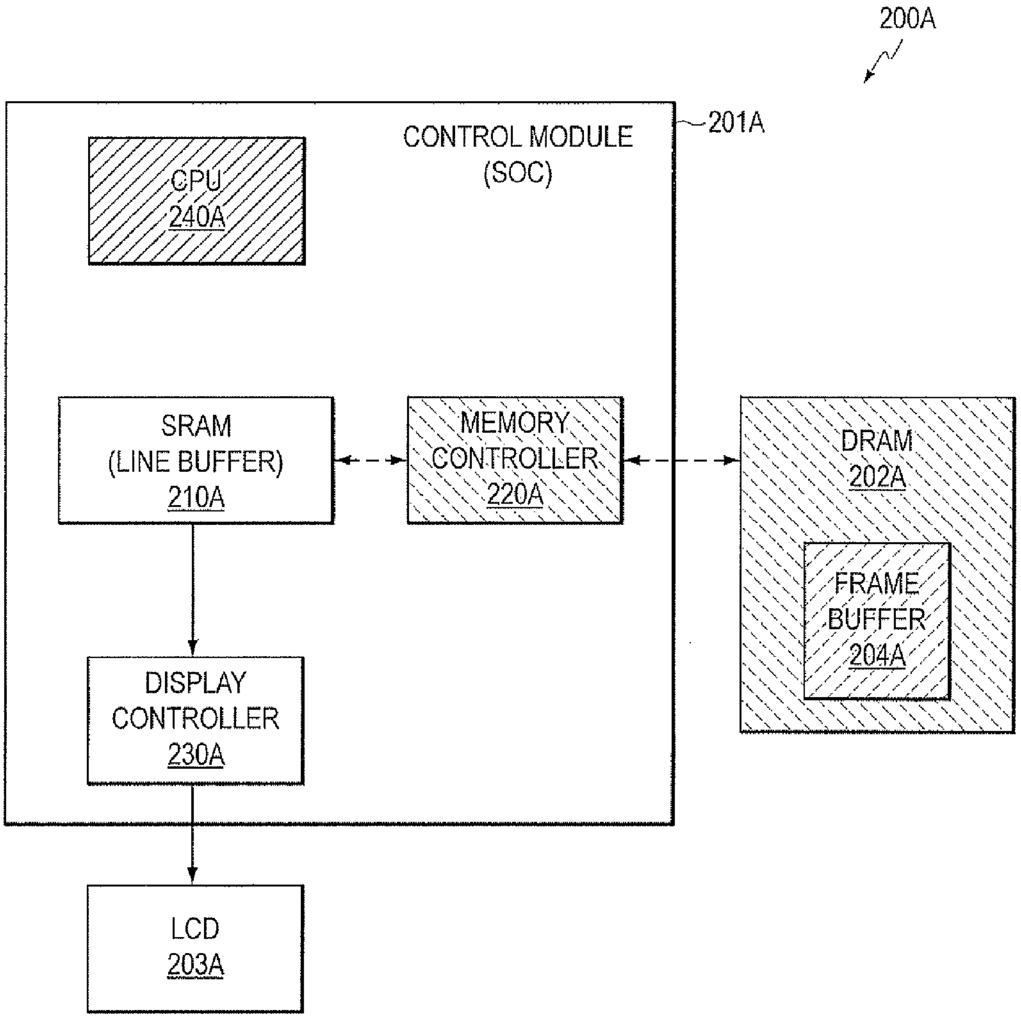
FIG. 2A shows a block diagram of an apparatus example in a power-saving mode according to an embodiment of the disclosure.

FIG. 2A shows a block diagram of an apparatus 200A in a power-saving mode according to an embodiment of the disclosure. The apparatus 200A includes a SOC chip 201A, a DRAM chip 202A that is external to the SOC chip 201A, and a LCD panel 203A. In the embodiment seen in FIG. 2A, the SOC chip 201A includes a CPU 240A, a SRAM module 210A that serves as a L2 cache for the CPU 240A when the CPU 240A is active, a memory controller 220A, and a display controller 230A.

In an embodiment, when the CPU 240A is idle, the apparatus 200A enters a power-saving mode referred as an e-book mode. In the e-book mode, in an example, the LCD panel 203A refreshes repetitively according to a last image frame, while various idle components of the apparatus 200A are suitably configured to reduce power consumption, such as by operating at a relatively low voltage, being powered down, being selectively powered down, and the like. When the CPU 240A resumes active, the apparatus 200A exits the e-book mode. It is noted that, in an embodiment, when the CPU 240A continues to remain idle in the e-book mode for a time duration, the apparatus 200A enters further power-saving mode in which the LCD panel 203A is suitably powered down.

In an example, a user uses the apparatus 200A to execute a word processing application. When the user stops inputting, for example, when the user is thinking or taking a rest, the CPU 240A is idle, and the apparatus enters the e-book mode. In another example, a user uses the apparatus 200A to read a book in an electronic form. When the user stops inputting, for example, leafing through pages of the book, the apparatus 200A enters the e-book mode. In the e-book mode, the CPU 240A enters a power saving mode, and the memory controller 220A and the DRAM chip 202A are selectively powered down. The SRAM 210A, the display controller 230A and the LCD panel 203A are active to refresh the last image frame on the LCD panel 203A. When the user resumes inputting, the CPU 240A is active, and the apparatus 200A exits the e-book mode.

Specifically, in the e-book mode, the CPU 240A is powered down, the SRAM 210A is decoupled from the CPU 240A, and is coupled to the display controller 230A to enable a pre-fetch-and-forward operation. In an embodiment, the SRAM 210A is configured as a line buffer that performs first-in-first-out. In an example, a size of the SRAM 210A is 128 KB.

The DRAM chip 202A includes a frame buffer 204A that buffers pixel data corresponding to the last image frame to be displayed by the LCD panel 203A. The memory controller 220A pre-fetches pixel data from the DRAM chip 202A in a burst form, such as using the full bandwidth of the DRAM chip 202A, and stores the pre-fetched pixel data into the SRAM 210A. On the other side, the display controller 230A uniformly continuously forwards pixel data from the SRAM 210A to the LCD panel 203A in a stream form based on a data rate corresponding to the refresh rate, and frees storage space in the SRAM 210A. Due to the relatively large difference between the bandwidth of the DRAM chip 202A and the data rate for the stream form, the memory controller 220A and the DRAM chip 202A has a relatively long idle time, and thus the memory controller 220A and the DRAM chip 202A enter the power-saving mode to save power. In an example, the memory controller 220A is then powered down, and the DRAM chip 202A enters the SRM.

In an embodiment, a size of the SRAM 210A is insufficient to store the entire image frame. Then, the memory controller 220A and the DRAM chip 202A are selectively activated to pre-fetch pixel data corresponding to a portion of the image frame in a burst form, store the pre-fetched pixel data into the SRAM 210A, and then enter the power-saving mode until further pixel data is required.

During operation, for example, when the apparatus 200A enters the c-book mode, the memory controller 220A pre-fetches pixel data corresponding to a first portion of the image frame from the DRAM chip 202A in a burst form, such as using the relatively large bandwidth of the DRAM chip 202A, and stores the pre-fetched pixel data into the SRAM 210A. Then, the memory controller 220A and the DRAM chip 202A enter the power-saving mode. The display controller 230A uniformly continuously forwards pixel data from the SRAM 210A to the LCD panel 203A in a stream form having the data rate corresponding to the refresh rate of the LCD panel 203A, and frees storage space in the SRAM 210A. When the SRAM 210A is almost empty, for example, when the free space of the SRAM 210A is larger than a threshold, the memory controller 220A and the DRAM chip 202A exit power-saving mode. The memory controller 220A pre-fetches pixel data corresponding to a second portion of the image frame from the DRAM chip 202A in a burst form, and stores the pre-fetched pixel data into the SRAM 210A. Then, the memory controller 220A and the DRAM chip 202A reenter the power-saving mode.

The memory controller 220A and the DRAM chip 202A stay in the power-saving mode until the free space in the SRAM 210A is larger than the threshold. The procedure repeats until the apparatus 200A exits the e-book mode.

Figure 2B:
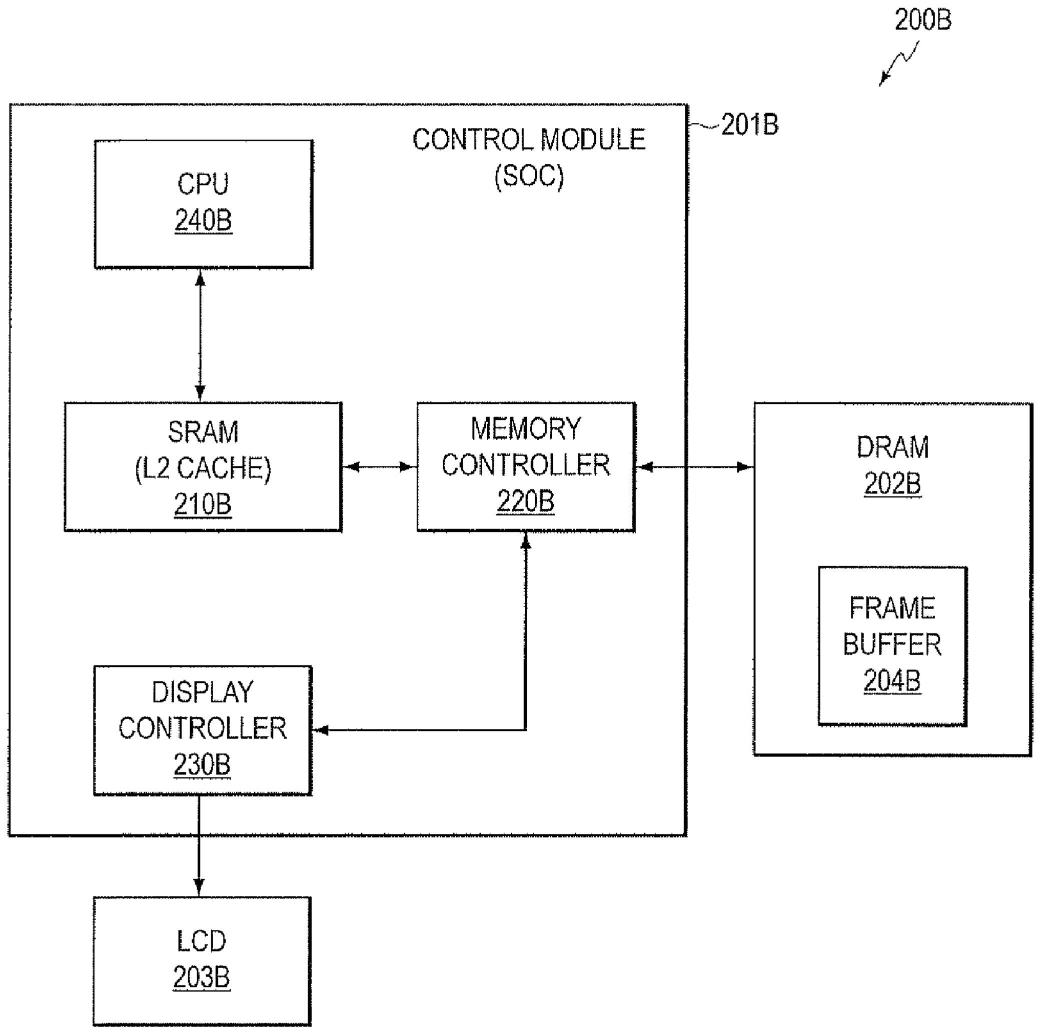
FIG. 2B shows a block diagram of an apparatus example in an active operation mode according to an embodiment of the disclosure.

FIG. 2B shows a block diagram of an apparatus 200B in an active operation mode according to an embodiment of the disclosure. The apparatus 200B and the apparatus 200A are a same apparatus in different modes of operation. The apparatus 200B includes same components as the apparatus 200A; however, these components are operatively connected differently, corresponding to the respective modes of operation. These components are similarly labeled in FIG. 2B; and the description of these components has been provided above and will be omitted here for clarity purposes.

In the active operation mode, the CPU 240B is active, and the SRAM 210B is decoupled from the display controller 230B, and is coupled to the CPU 240B to serve as the L2 cache for the CPU 240B. The DRAM chip 202B includes the frame buffer 204B that buffers pixel data corresponding to one or more image frames to be displayed by the LCD panel 203B. The memory controller 220B allocates a portion of the bandwidth that is equivalent to the data rate for refreshing the LCD panel 203B for fetching the pixel data from the DRAM chip 202B. Then, the display controller 230B forwards the fetched pixel data to the LCD panel 203B. In an embodiment, the memory controller 220B or the display controller 230B includes a relatively small FIFO buffer (not shown), such as a FIFO buffer that uses 128 B read transitions to fetch pixel data from the DRAM chip 202B, and to buffer the fetched pixel data. It is noted that the memory controller 220B allocates other portions of the bandwidth for other purposes, such as for the CPU 240B, and the like. It is also noted that, in an example, the FIFO buffer has larger storage space than 128 B, but uses 128 B for read transitions.

Figure 3A:
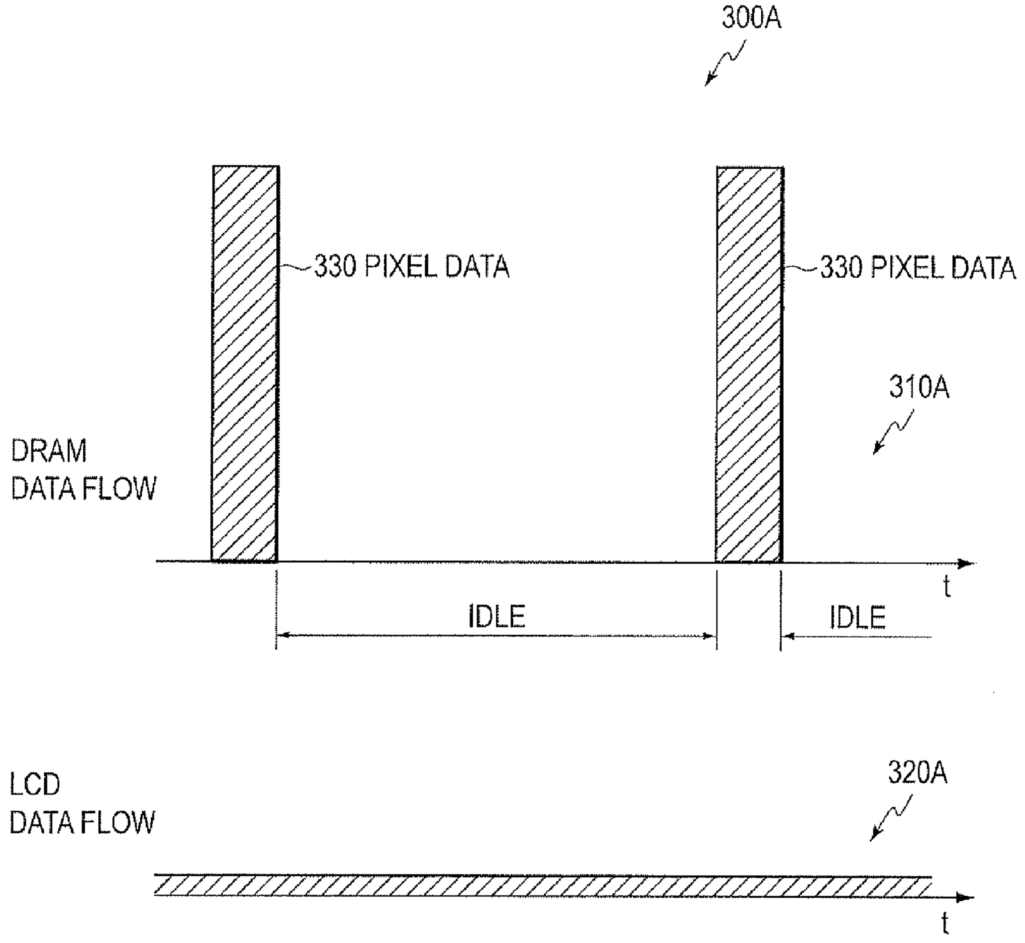
FIG. 3A-3B show plots of data flows corresponding to FIG. 2A-2B.

FIG. 3A shows a plot 300A of data flows with regards to time (t). The plot 300A corresponds to FIG. 2A when the apparatus 200A is in the power saving mode/e-book mode. The plot 300A includes a DRAM data flow 310A and an LCD data flow 320A. The DRAM data flow 310A includes bursts 330 of pixel data. The bursts 330 utilize the relatively large bandwidth, such as the full bandwidth, of the DRAM chip 202A to pre-fetch pixel data into the SRAM 210A. The pre-fetched data is then provided to the LCD panel 203A using a relatively uniform data rate corresponding to the refresh rate of the LCD panel 203A, as shown by the LCD data flow 320A in FIG. 3A. In an embodiment, the relatively constant data rate is much smaller than the bandwidth of the DRAM chip 202A, thus the DRAM chip 202A has a relatively long idle time, and suitably enters the SRM, for example, to reduce power consumption.

Figure 3B:
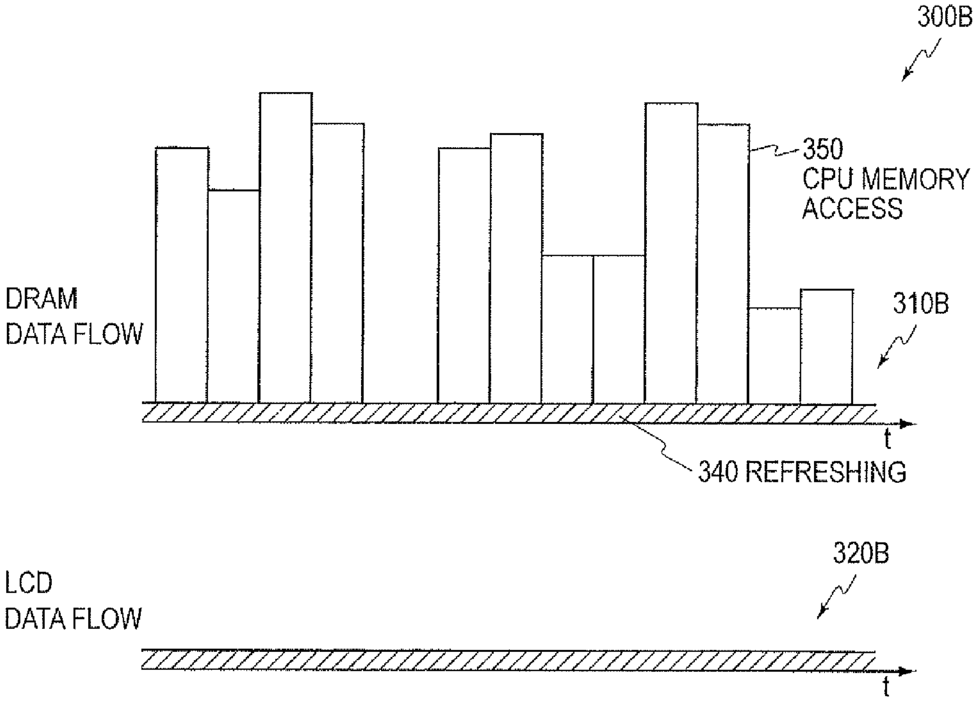

FIG. 3B shows a plot 300B of data flows with regards to time (t). the plot 300B corresponds to FIG. 2B when the apparatus 200B is in the active operation mode. The plot 300B includes a DRAM data flow 310B and an LCD data flow 320B. The LCD data flow 320B is similar to the LCD data flow 320A in FIG. 3A that has the relatively constant data rate corresponding to the refresh rate of the LCD panel 203B. The DRAM data flow 310B shows that a relatively constant bandwidth portion 340 of the DRAM chip 202B is allocated for refreshing the LCD panel 203B. In addition, other portions of the bandwidth are suitably allocated for operations of the CPU 240B, for example.

FIG. 4 shows a comparison table 400 according to an embodiment of the disclosure. The comparison table 400 includes a first field 410, a second field 420 and a third field 430. The first field 410 lists parameters for comparison. The second field 420 corresponds to using a 128K L2 cache to enable pre-fetch-and forward style in an e-book mode, as described with regard to FIG. 2A. The second field 420 includes values corresponding to the parameters in the first field 410. The third field 430 corresponds to using an FIFO buffer that uses 128 B read transitions in the e-book mode. The third field 430 includes values corresponding to the parameters in the first field 410. As seen in the comparison table 400, due to the relatively larger size of the 128 KB L2 cache, the DRAM has about 175K clock cycles idle time after each pre-fetching, that is much larger than the SRM latency (~512 clock cycles). Thus the DRAM enters the SRM to reduce power consumption. For the FIFO buffer, the DRAM idle time is about 175 clock cycles after each fetching, which is smaller than the SRM latency. Thus the DRAM stays in the active mode when the FIFO buffer is used.

Figure 5:
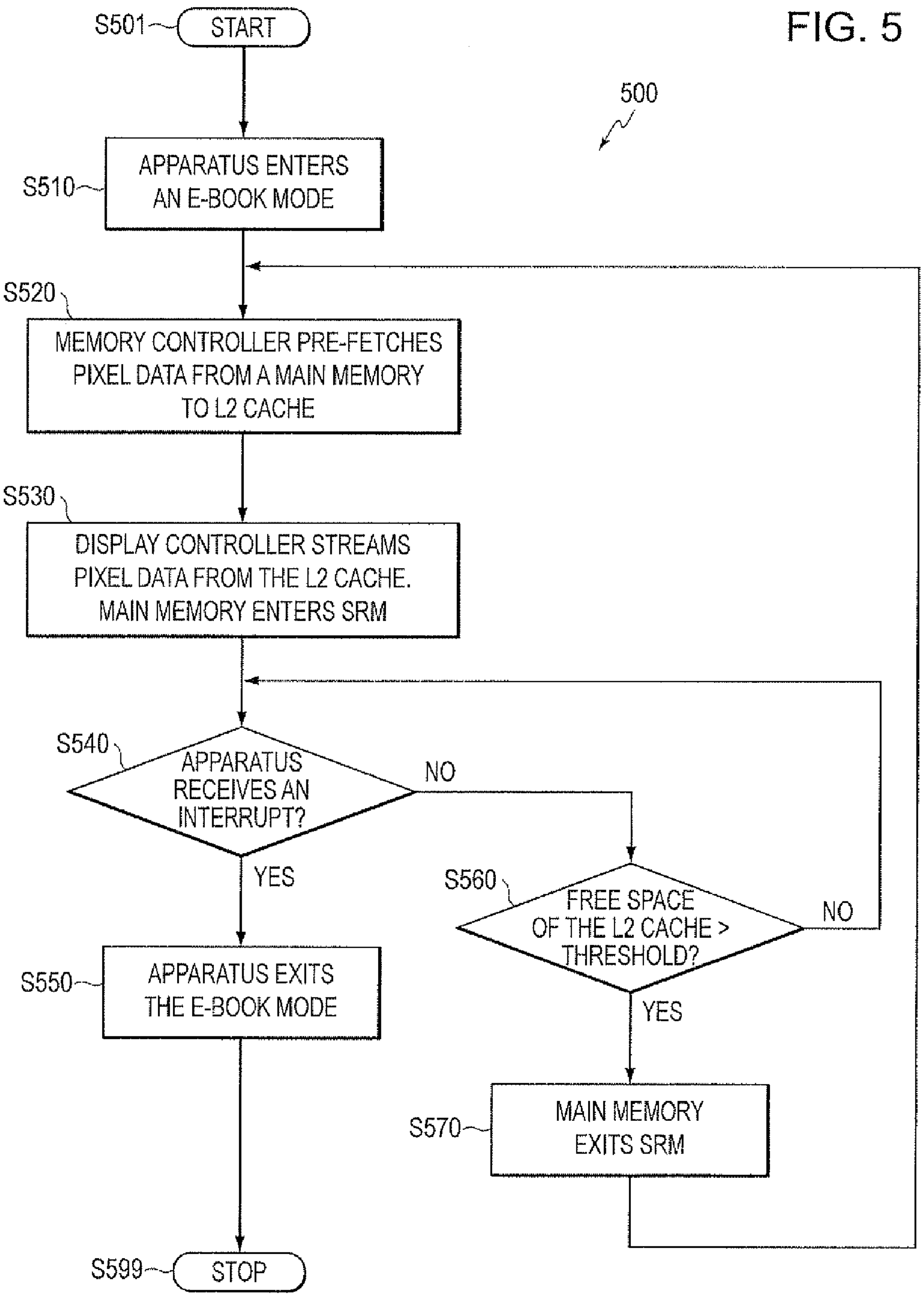
FIG. 5 shows a flowchart outlining a process example for refreshing display panel according to an embodiment of the disclosure.

FIG. 5 shows a flowchart outlining a process example 500 for an apparatus to refresh a display panel in an e-book mode according to an embodiment of the disclosure. The apparatus includes a CPU, an L2 cache for the CPU, a main memory, a memory controller for accessing the main memory, a display panel, and a display controller for providing pixel data to refresh the display panel. When the CPU is idle, the apparatus enters the e-book mode. In the e-book mode, the main memory includes a frame buffer that buffers pixel data of a last image frame for displaying. The display panel repetitively refreshes pixels on a screen according to the pixel data of the last image frame. The process starts at S501 and proceeds to S510.

At S510, the apparatus enters the e-book mode. In an embodiment, the apparatus includes a first bus that couples the L2 cache to the CPU, and a second bus that couples the L2 cache to the display controller. When the apparatus enters the e-book mode, the first bus is disabled to decouple the L2 cache from the CPU, and the second bus is enabled to couple the L2 cache with the display controller.

At S520, the memory controller pre-fetches pixel data in a burst form from the main memory into the L2 cache. In an embodiment, the memory controller pre-fetches the pixel data using a full bandwidth of the main memory. In an example, the L2 cache does not have enough space for all the pixel data of the image frame. The memory controller pre-fetches pixel data corresponding to a portion of the image frame into the L2 cache.

At S530, the display controller streams the pixel data from the L2 cache to the display panel for refreshing pixels on the screen, and the main memory enters a low power mode, such as a self-refresh-mode (SRM). In an example, the L2 cache is configured as a first-in-first-out line buffer. When pixel data is streamed out, the space that stores the pixel data is freed. In an example, the main memory enters the SRM in response to a control signal from the memory controller. In another example, the main memory enters the SRM when an idle time of the main memory is longer than a threshold.

At S540, the apparatus determines whether an interrupt, such as a user input, is received. When the apparatus receives an interrupt, the process proceeds to S550; otherwise, the process proceeds to S560.

At S550, the apparatus exits the e-book mode. In an example, the second bus is disabled to decouple the L2 cache from the display controller, and the first bus is enabled to couple the L2 cache to the CPU. Then, the process proceeds to S599 and terminates.

At S560, the apparatus determines whether a free space of the L2 cache is larger than a threshold. When the free space is larger than the threshold, the process proceeds to S570; otherwise the process returns to S540 to detect interrupt. At same time, the display controller continues stream pixel data from the L2 cache.

At S570, the main memory exits the SRM mode. The process returns to S520 that the memory controller pre-fetches pixel data corresponding to another portion of the image frame from the main memory to the L2 cache.

It is noted that the process 500 can be suitably modified. In an example, S570 is omitted. When the memory controller pre-fetches pixel data from the main memory, the main memory automatically exits the SRM.

It is noted that, in an embodiment, an e-book module is implemented as a software module that can be plugged in any suitably application software. The e-book module includes suitably controls, algorithms, and the like, to enable an apparatus to be suitably configured in the e-book mode to allow a pre-fetch-and-forward style operation for refreshing a display. The pre-fetch-and-forward style operation increases an idle time of a main memory, and thus the main memory enters a power-saving mode to save power.

While the invention has been described in conjunction with the specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the scope of the invention.

What is claimed is:

1. An integrated circuit, comprising:

a first memory on the integrated circuit;

a memory controller selectively coupled to the first memory and to a second memory that has a higher power consumption than the first memory, the memory controller, while coupled to the first memory and to the second memory, being configured to pre-fetch at regular intervals pixel data corresponding to a still image from the second memory to the first memory at a first data rate when the integrated circuit is in a power saving mode; and a display controller coupled to the first memory and to a display module, the display controller streaming the pre-fetched pixel data from the first memory to the display module at a second data rate that is lower than the first data rate.

2. The integrated circuit of claim 1, wherein the memory controller is coupled to the second memory that is external to the integrated circuit.

3. The integrated circuit of claim 1, wherein the memory controller selectively configures the second memory into a memory power-saving mode.

4. The integrated circuit of claim 1, wherein the memory controller is configured into a power-saving mode after the pre-fetching.

5. The integrated circuit of claim 1, wherein, when the integrated circuit is in an active mode, the display controller streams the pixel data from the second memory to the display module based on the second data rate via the memory controller.

6. The integrated circuit of claim 5, wherein a processing unit is coupled to the first memory and is configured to use the first memory as a cache memory when the integrated circuit is in the active mode, and is decoupled from the first memory when the integrated circuit is in the power saving mode.

7. A method for refreshing display, comprising:

pre-fetching at regular intervals pixel data corresponding to a still image into a first memory on a system-on-chip (SOC) from a second memory at a first data rate, the second memory being external to the SOC and having a higher power consumption than the first memory;

streaming the pixel data from the first memory to a display module at a second data rate that is lower than the first data rate to refresh the display module; and configuring the second memory into a memory power-saving mode after the pre-fetching and until additional pixel data is required.

8. The method of claim 7, wherein pre-fetching the pixel data corresponding to the image into the first memory on the SOC from the second memory based on the first data rate, further comprises:

pre-fetching the data into the first memory on the SOC from the second memory that is external to the SOC.

9. The method of claim 7, further comprising:

streaming the data from the second memory to the display module based on the second data rate when the first memory is decoupled from the display module.

10. The method of claim 9, further comprising:

decoupling the first memory from the display module when a processing unit enters an active mode to utilize the first memory as a cache memory; and coupling the first memory to the display module when the processing unit enters an idle mode.

11. An apparatus, comprising:

a display module configured to display an image frame based on pixel data of the image frame;

an external memory device configured to store pixel data of image frames to be displayed on the display module; and a system-on-chip (SOC) having:

an internal memory having lower power consumption than the external memory device;

a memory controller coupled to the internal memory and to the external memory device, the memory controller pre-fetching at regular intervals pixel data corresponding to a portion of the image frame from the external memory device to the internal memory at a first data rate when the apparatus enters a power saving mode, the external memory device being configured to enter a memory power-saving mode after the pre-fetching until additional pixel data is required; and a display controller coupled with the display module to stream the pixel data from the internal memory to the display module at a second data rate that is lower than the first data rate.

12. The apparatus of claim 11, wherein the memory controller configures the external memory device into the memory power-saving mode until the external memory device is accessed for additional pixel data.

13. The apparatus of claim 11, wherein the external memory is configured into the memory power-saving mode when an idle time is longer than a threshold.

14. The apparatus of claim 11, wherein the memory controller is configured into a power-saving mode after the pre-fetching.

15. The apparatus of claim 11, wherein, when the apparatus enters an active mode, the display controller streams the pixel data from the external memory device to the display module based on the second data rate via the memory controller.

16. The apparatus of claim 15, wherein the SOC further comprises:

a processing unit configured to be coupled to the first memory and to use the first memory as a cache memory when the apparatus is in the active mode, and to be decoupled from the first memory when the apparatus is in the power saving mode.

17. The apparatus of claim 11, wherein, when a processing unit is idle, the apparatus enters the power saving mode, and the external memory device stores pixel data corresponding to a still image to be displayed by the display module.

18. An integrated circuit, comprising:

a first memory on the integrated circuit;

a memory controller selectively coupled to the first memory and to a second memory that has a higher power consumption than the first memory, the memory controller, while coupled to the first memory and to the second memory, being configured to periodically pre-fetch pixel data corresponding to a portion of an image from the second memory to the first memory at a first data rate when the integrated circuit is in a power saving mode; and a display controller coupled to the first memory and to a display module, the display controller streaming the pre-fetched pixel data from the first memory to the display module at a second data rate that is lower than the first data rate.

19. A method for refreshing display, comprising:

pre-fetching at regular intervals pixel data corresponding to a portion of an image into a first memory on a system-on-chip (SOC) from a second memory at a first data rate, the second memory being external to the SOC and having a higher power consumption than the first memory;

streaming the pixel data from the first memory to a display module at a second data rate that is lower than the first data rate to refresh the display module; and configuring the second memory into a memory power-saving mode after the pre-fetching and until additional pixel data is required.

20. An apparatus, comprising:

a display module configured to display an image frame based on pixel data of the image frame;

an external memory device configured to store pixel data of image frames to be displayed on the display module; and a system-on-chip (SOC) having:

an internal memory having lower power consumption than the external memory device;

a memory controller coupled to the internal memory and to the external memory device, the memory controller pre-fetching at regular intervals pixel data corresponding to a still image frame from the external memory device to the internal memory at a first data rate when the apparatus enters a power saving mode, the external memory device being configured to enter a memory power-saving mode after the pre-fetching until additional pixel data is required; and a display controller coupled with the display module to stream the pixel data from the internal memory to the display module at a second data rate that is lower than the first data rate.

* * * * *